United States Patent [19]

Hyodo

[11] Patent Number: 4,648,614

[45] Date of Patent: Mar. 10, 1987

[54] STEERING SYSTEM IN WHEELED VEHICLE

[75] Inventor: Youichi Hyodo, Toyota, Japan

[73] Assignee: Toyota Jidosha Kabushiki Kaisha, Aichi, Japan

[21] Appl. No.: 817,123

[22] Filed: Jan. 8, 1986

[30] Foreign Application Priority Data

Jan. 11, 1985 [JP] Japan .................................. 60-3797

[51] Int. Cl.$^4$ ............................................. B62D 3/02
[52] U.S. Cl. .................................... 280/91; 180/141; 180/236
[58] Field of Search .................. 280/91; 180/141, 142, 180/143, 236; 74/484 R, 485

[56] References Cited

U.S. PATENT DOCUMENTS

| 3,596,730 | 8/1971 | Cecce | 180/236 |
| 4,467,885 | 8/1984 | Furukawa et al. | 280/91 |
| 4,557,493 | 12/1985 | Sano et al. | 280/91 |
| 4,566,709 | 1/1986 | Sano | 280/91 |
| 4,572,316 | 2/1986 | Kanazawa et al. | 180/143 |

FOREIGN PATENT DOCUMENTS

| 59-26363 | 2/1984 | Japan . |
| 59-26364 | 2/1984 | Japan . |
| 59-26365 | 2/1984 | Japan . |

Primary Examiner—John J. Love
Assistant Examiner—Kenneth R. Rice
Attorney, Agent, or Firm—Parkhurst & Oliff

[57] ABSTRACT

A four-wheel steering system in a wheeled vehicle comprises a front-wheel steering linkage, a rear-wheel steering linkage including a lateral control shaft operatively connected at its opposite ends with a pair of rear steerable road wheels, and a rear-wheel steering mechanism for interconnecting the steering linkages. The rear-wheel steering mechanism comprises a housing mounted on a vehicle body structure for axially slidably and rotatably supporting thereon the control shaft, a first cylindrical carrier body mounted within the housing for rotation about a vertical axis perpendicular to the central axis of the control shaft and arranged to be rotated in response to operation of the front-wheel steering linkage, a second cylindrical carrier body mounted within the first carrier body for rotation about the central axis of the control shaft, a radial rod integral with the control shaft and arranged within the interior of the second carrier body, the radial rod extending perpendicular to the central axis of the control shaft, a universal joint mounted within the second carrier body for slidably supporting the radial rod, and an actuator assembly mounted on the housing for rotating the control shaft.

3 Claims, 6 Drawing Figures

STEERING SYSTEM IN WHEELED VEHICLE

BACKGROUND OF THE INVENTION

1. Field of the invention

The present invention relates to a steering system in a wheeled vehicle, and more particularly to a steering system in a wheeled vehicle the front-wheel steering linkage of which is interconnected to a rear-wheel steering linkage to selectively steer the rear road wheels in response to steering operation of the front road wheels.

2. Discussion of the background

Such a four-wheel steering system as described above has been proposed in Early Publications for Japanese Patent Nos. 59-26363, 59-26364 and 59-26365, which steering system comprises a front-wheel steering linkage arranged to be operated by a steering wheel, a rear-wheel steering linkage including a lateral control shaft operatively connected at the opposite ends thereof with a pair of rear steerable road wheels, a rotary shaft extending longitudinally in a fore-and-aft direction of the vehicle and operatively connected at the front end thereof with the front-wheel steering linkage, and a rear-wheel steering mechanism operatively connected to the rear end of the rotary shaft to effect axial displacement of the lateral control shaft in response to rotary motion of the rotary shaft. For the purpose of controlling the steering angle ratio and direction of the rear road wheels relative to the front road wheels, the rear-wheel steering mechanism comprises an input shaft arranged to be rotated by the rotary shaft, an output shaft swingably connected at one end thereof with the input shaft by means of a universal joint and integrally connected at the other end thereof with the lateral control shaft of the rear-wheel steering linkage, and an actuator assembly arranged to incline the output shaft with respect to the input shaft. In this arrangement, the actuator assembly is activated to adjust the inclined angle of the output shaft for controlling the steering angle ratio and direction of the rear road wheels relative to the front road wheels. However, the adjustment of the inclined angle of the output shaft causes axial displacement of the lateral control shaft in a condition where the rotary shaft is stopping. This results in change of the alignment of the rear road wheels.

SUMMARY OF THE INVENTION

It is, therefore, a primary object of the present invention to provide an improved rear-wheel steering mechanism for the steering system capable of controlling the steering angle ratio and direction of the rear road wheels relative to the front road wheels without causing any change of the alignment of the rear road wheels.

Another object of the present invention is to provide an improved rear-wheel steering mechanism having the above-described characteristics and capable of selectively controlling the steering direction of the rear road wheels in accordance with the vehicle speed.

According to the present invention, there is provided an improved rear-wheel steering mechanism which comprises a housing mounted on a vehicle body structure for rotatably supporting thereon the lateral control shaft of the rear-wheel steering linkage, a first cylindrical carrier body mounted within the housing for rotation about a vertical axis perpendicular to the central axis of the lateral control shaft and drivingly connected to the rear end of the rotary shaft to be rotated in response to operation of the front-wheel steering linkage, a second cylindrical carrier body mounted within the first cylindrical carrier body for rotation about the central axis of the lateral control shaft, a radial rod integral with the lateral control shaft and arranged within the interior of the second cylindrical carrier body, the radial rod extending perpendicularly to the central axis of the control shaft, a universal joint assembly mounted within the second cylindrical carrier body for slidably supporting the radial rod of the control shaft, and an actuator assembly mounted on the housing for rotating the control shaft in accordance with the vehicle speed.

BRIEF DESCRIPTION OF THE DRAWINGS

Other objects and features of the present invention will become apparent to those skilled in the art as the disclosure is made in the following detailed description of a preferred embodiment of the invention as illustrated in the accompanying drawings, in which.

DETAILED DESCRIPTION OF THE PREFERRED EMBODIMENTS

Figure 1:
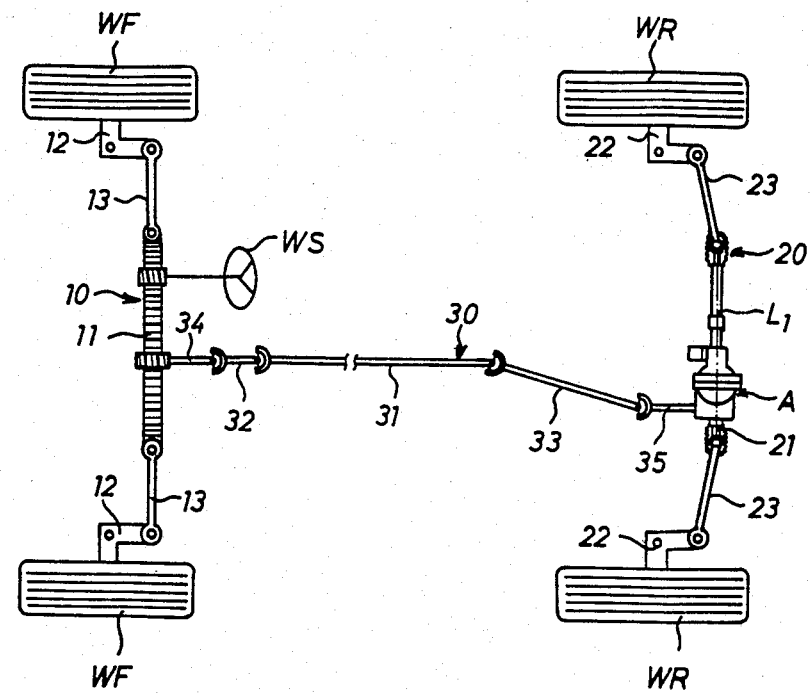
FIG. 1 is a schematic illustration of a four-wheel steering-system in a wheeled vehicle.

Referring now to the drawings, particularly in FIG. 1, there is illustrated a four-wheel steering system in a wheeled vehicle the front-wheel steering linkage 10 of which is interconnected to a rear-wheel steering linkage 20. The front-wheel steering linkage 10 comprises a lateral rack-bar 11 operatively connected to a steering wheel WS to be displaced by the driver's effort applied to the steering wheel, a pair of knuckle arms 12 connected to respective front steerable road wheels WF in a usual manner, and a pair of tie-rods 13 linked at their inner ends with the opposite ends of rack-bar 11 and at their outer ends with the respective knuckle arms 12. The rear-wheel steering linkage 20 comprises a lateral control shaft 21 arranged to be rotatable about a lateral axis $L_1$, a pair of knuckle arms 22 connected to respective rear steerable road wheels WR in a usual manner, and a pair of tie-rods 23 linked at their inner ends with the opposite ends of control shaft 21 and at their outer ends with the respective knuckle arms 22. The control shaft 21 is operatively connected to the rack-bar 11 by means of a rear-wheel steering mechanism A and a rotary shaft assembly 30.

Figure 2:
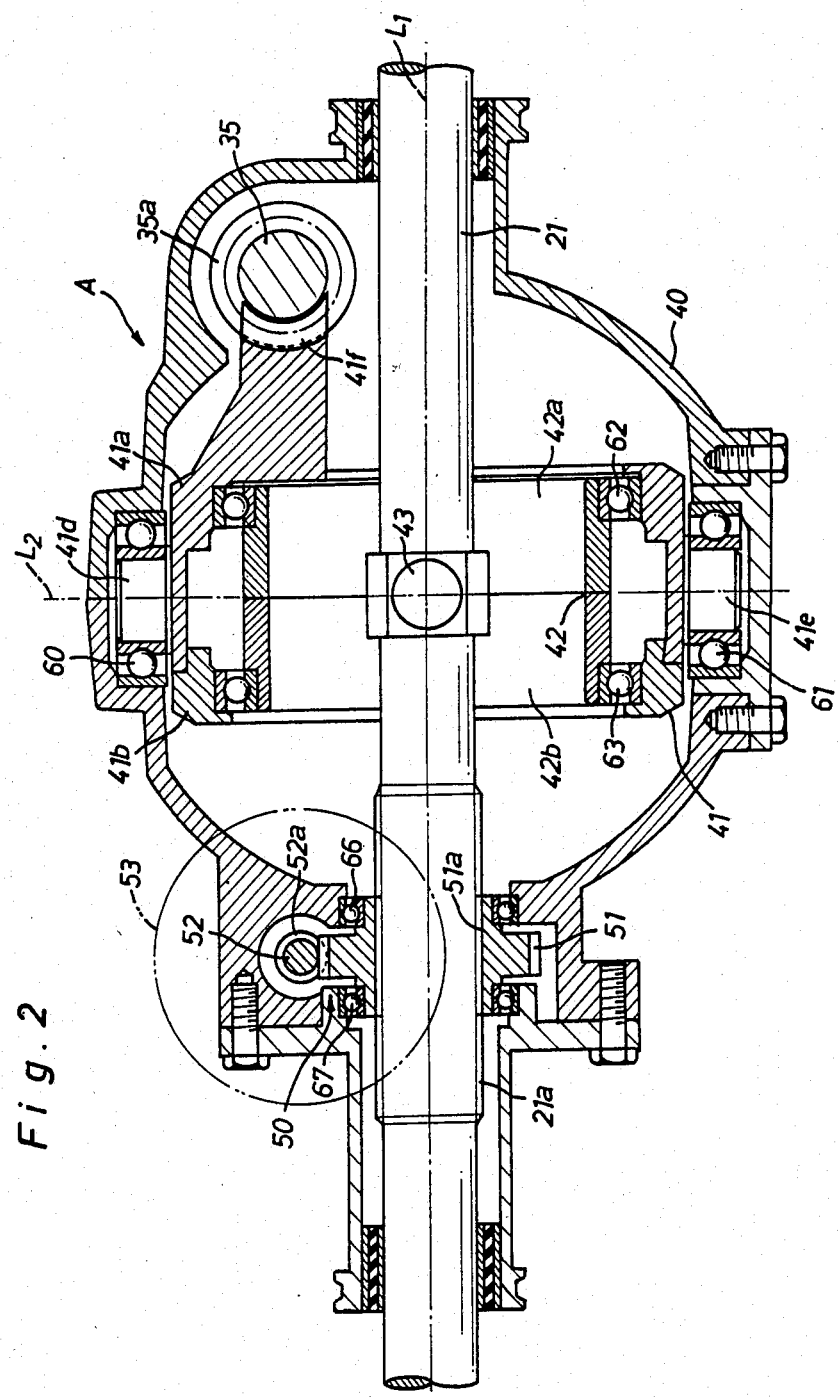
FIG. 2 illustrates a vertical section of a rear-wheel steering mechanism in accordance with the present invention.
Figure 3:
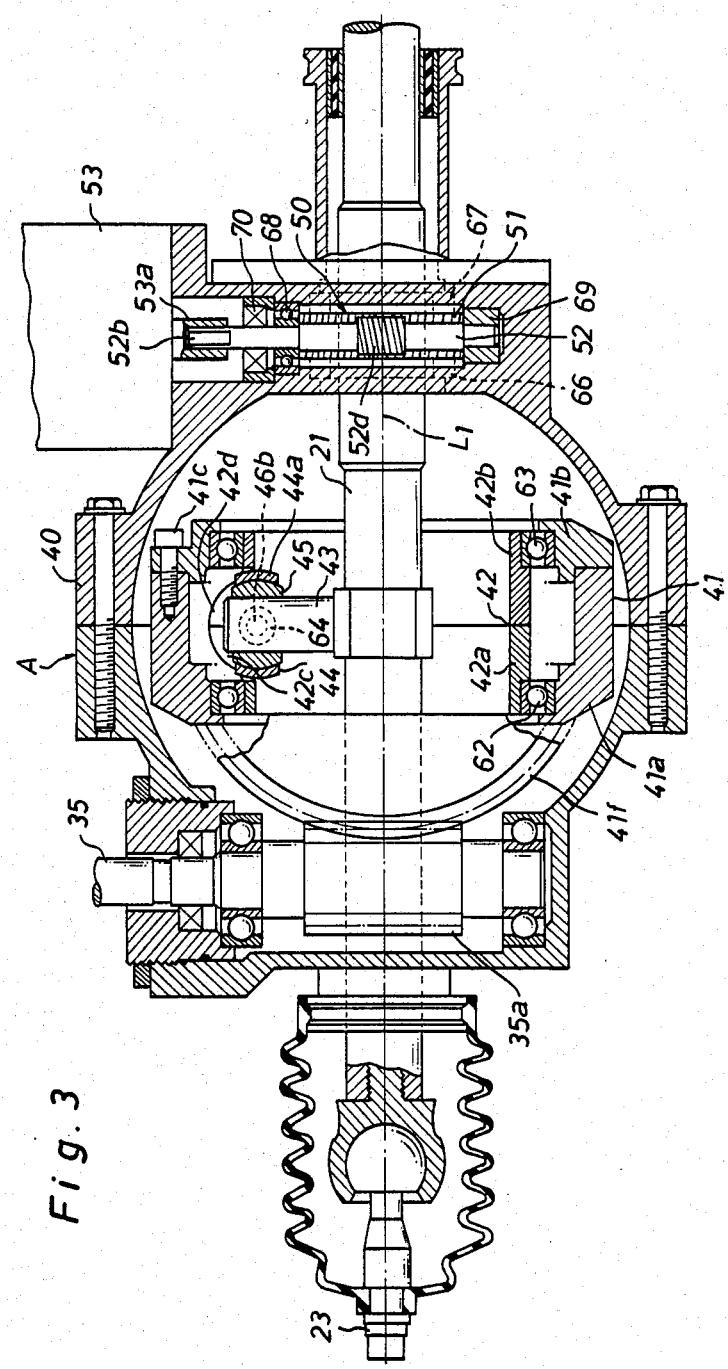
FIG. 3 is a sectioned plan view of the rear-wheel steering mechanism shown in FIG. 2.
Figure 4:
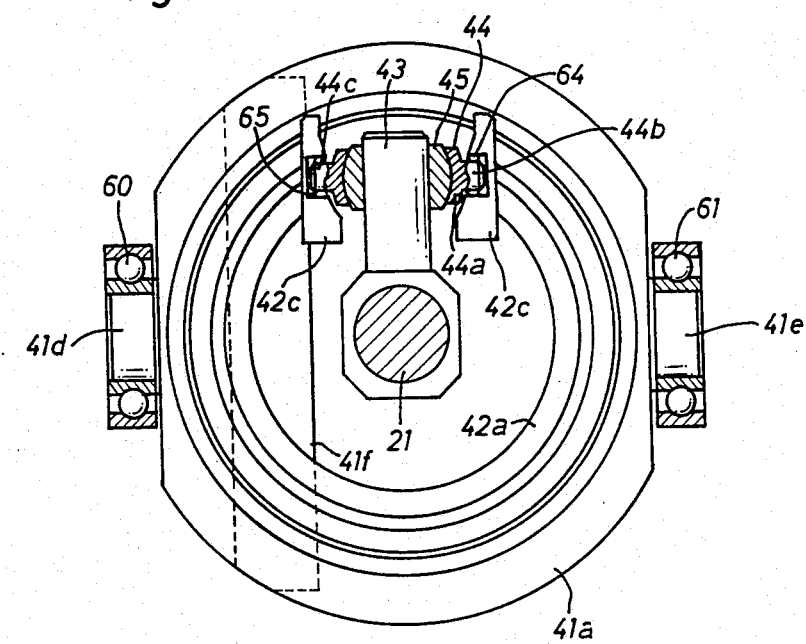
FIG. 4 is a partially sectioned side view illustrating a relationship of a first carrier body, a second carrier body, a radial rod and a universal joint assembly shown in FIGS. 2 and 3.

The rotary shaft assembly 30 includes a main shaft 31, a pair of intermediate shafts 32 and 33, and a pair of pinion shafts 34 and 35. The main shaft 31 is rotatably carried on a vehicle body structure (not shown) and extends longitudinally in a fore-and-aft direction of the vehicle. The main shaft 31 is drivingly connected at its front end to the rack-bar 11 by way of the intermediate shaft 32 and the pinion shaft 34 and drivingly connected at its rear end to the pinion shaft 35 by way of the intermediate shaft 33. As shown in FIGS. 2 to 4, the rear-wheel steering mechanism A includes a housing 40 mounted on the vehicle body structure, a first carrier body 41 rotatably mounted within the housing 40, a second carrier body 42 rotatably mounted within the first carrier body 41, and a remotely controlled actuator assembly 50. The first carrier body 41 is composed of a cylindrical carrier member 41a and an annular carrier member 41b secured to the first carrier member 41a by means of fastening bolts 41c. As shown in FIG. 2, the cylindrical carrier member 41a is integrally provided at its upper and lower ends with a pair of bearing portions 41d and 41e which are supported on the housing 40 through a pair of ball bearings 60 and 61 in such a manner that the first carrier body 41 is arranged to be rotatable about a vertical axis $L_2$ perpendicular to the central axis $L_1$ of lateral control shaft 21. The cylindrcal carrier member 41a is further integrally provided at one side thereof with a toothed semi-circular portion 41f which is arranged to be rotatable about the vertical axis $L_2$. The toothed semi-circular portion 41f of carrier member 41a is permanently in meshing engagement with a pinion 35a of the pinion shaft 35 which is rotatably mounted on the housing 40.

The second carrier body 42 is composed of a pair of cylindrical carrier members 42a and 42b which are fitted to each other and supported within the first carrier body 41 by means of a pair of axially spaced ball bearings 62 and 63 for rotation about the central axis $L_1$ of lateral control shaft 21. As shown in FIG. 4, the cylindrical carrier member 42a is integrally formed with a pair of opposed support arms 42c and 42c for supporting thereon a universal joint assembly 44, and the cylindrical carrier member 42b is also integarlly formed with a pair of opposed support arms 42d and 42d which are coupled with the opposed support arms 42c and 42c to form a pair of opposed coaxial bores. The lateral control shaft 21 is integrally provided with a radial rod 43 which extends perpendicularly to the central axis $L_1$ of lateral control shaft 21. The universal joint assembly 44 includes an outer race 44a formed with an internal spherical surface and integrally provided with a pair of lateral pins 44b and 44c, and an inner race 45 rotatably coupled within the outer race 44a. The lateral pins 44b and 44c of outer race 44a are rotatably supported by a pair of axially spaced bearings 64 and 65 mounted within the coupled support arms 42c and 42d of carrier members 42a and 42b. The radial rod 43 of control shaft 21 is slidably supported by the inner race 45 of the universal joint assembly 44 to permit relative movement of the control shaft 21 with respect to the second carrier body 42.

The remotely controlled actuator assembly 50 includes a drive gear 51 splined to the lateral control shaft 21 for rotation therewith, a pinion shaft 52 provided thereon with a pinion 52a in meshing engagement with the drive gear 51, and an electric motor 53 mounted on the housing 40 to rotate the pinion shaft 52 in response to an electric control signal applied thereto. The drive gear 51 has internally splined teeth 51a slidably engaged with externally splined teeth 21a of shaft 21 for permitting axial displacement of the control shaft 21. The drive gear 51 is rotatably supported on the housing 40 through a pair of axially spaced ball bearings 66 and 67 for rotation about the lateral axis $L_1$. The pinion shaft 52 is rotatably supported on the housing 40 through a pair of axially spaced bearings 68 and 69 and extends through a sealing member 70 toward the motor 53. The motor 53 has an output shaft 53a drivingly connected to the outer end 52b of pinion shaft 52 and is arranged to rotate the pinion shaft 52 in a forward or reverse direction in accordance with the vehicle speed.

In operation of the steering system, rightward or leftward displacement of the rack-bar 11 is effected by operation of the steering wheel WS to steer the front road wheels WF leftwards or rightwards and to rotate the rotary shaft assembly 30. In this steering operation, the pinion shaft 35 of the shaft assembly 30 is driven to effect counterclockwise or clockwise rotation of the first carrier body 41 about the vertical axis $L_2$. Assuming that the radial rod 43 of control shaft 21 is in a forward position perpendicular to the vertical axis $L_2$, the second carrier body 42 and the universal joint assembly 44 are rotated about the vertical axis $L_2$ in accordance with counterclockwise or clockwise rotation of the first carrier body 41 to effect rightward or leftward displacement of the radial rod 43. In this instance, the outer race 44 rotates at its lateral pins 44b and 44c, and the inner race 45 slides along the radial rod 43. As a result, the lateral control shaft 21 is displaced rightwards or leftwards to steer the rear road wheels WR leftwards or rightwards. Thus, the front and rear road wheels WF and WR are steered in the same direction. While the radial rod 43 is forwardly inclined at an angle relative to the vertical axis $L_2$, the above operation will be effected. Additionally, the steering angle ratio of the rear road wheels WR relative to the front road wheels WF will be adjusted in accordance with the forwardly inclined angle of the radial rod 43. When the radial rod 43 of control shaft 21 is in the illustrated position, the steering angle ratio of the rear road wheels WR becomes a maximum value.

Assuming that the actuator assembly 50 is activated to rotate the radial rod 43 of control shaft 21 upwards and retain it on the vertical axis $L_2$ without any inclined angle, the second carrier body 42 and the universal joint assembly 44 rotate about the vertical axis $L_2$ when the first carrier body 41 is rotated counterclockwisely or clockwisely to steer the front road wheels WF leftwards or rightwards. In such a condition, the radial rod 43 of control shaft 21 is remained on the vertical axis $L_2$ to retain the control shaft 21 in the neutral position. Thus, the rear road wheels WR may not be steered in steering operation of the front road wheels WF. When the actuator assembly 50 is further activated to rotate the radial rod 43 of control shaft 21 rearwards and retain it in a rearward position perpendicular to the vertical axis $L_2$, the second carrier body 42 and the universal joint assembly 44 are rotated about the vertical axis $L_2$ in accordance with counterclockwise or clockwise rotation of the first carrier body 41 to effect leftward or rightward displacement of the radial rod 43. In this instance, the outer race 44a of universal joint assembly 44 rotates about its lateral pins 44b and 44c, and the inner race 45 slides along the radial rod 43. As a result, the lateral control shaft 21 is displsed leftwards or rightwards to steer the rear road wheels WR rightwards or leftwards. Thus, the rear road wheels WR are steered in a reverse direction to the front road wheels WF. While the radial rod 43 of control shaft 21 is rearwardly inclined at an angle relative to the vertical axis $L_2$, the above operation will be effected, and the steering angle ratio of the rear road wheels WR to the front road wheels WF will be adjusted in accordance with the rearwardly inclined angle of the radial rod 43. When the radial rod 43 is retained in the rearward position perpendicular to the vertical axis $L_2$, the rear road wheels WR will be steered at a maximum steering angle relative to the front road wheels WF.

In the case that the actuator assembly 50 is arranged to be activated by an electric control signal indicative of the vehicle speed, the inclined angle of the radial rod 43 is controlled in accordance with the vehicle speed. In such control of the radial rod 43, the steering angle ratio and direction of the rear road wheels WR relative to the front road wheels WF are adjusted in accordance with the vehicle speed. In the above-described embodiment, the lateral control shaft 21 does not displace when the radial rod 43 of control shaft 21 is rotated by activation of the actuator assembly 53. As a result, the steering angle ratio and direction of the rear road wheels can be controlled without causing any change of the alignment of the rear road wheels.

Figure 5:
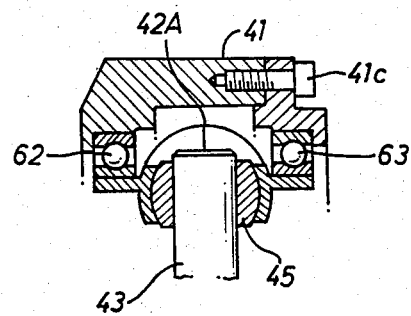
FIGS. 5 and 6 illustrate a modification of the universal joint assembly shown in FIGS. 3 and 4.
Figure 6:
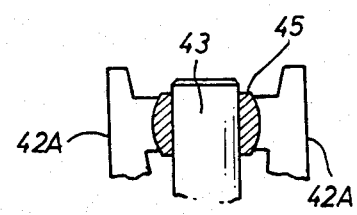

Although a specific embodiment of the present invention has been shown and described, it is obvious that many modifications thereof are possible. For example, the universal joint assembly 44 may be modified as shown in FIGS. 5 and 6. In this modification, the inner race 45 of universal joint assembly 44 is rotatably coupled with internal spherical surfaces of support arms 42A which are integrally formed with the cylindrical carrier members 42a and 42b. The invention, therefore, is not intended to be restricted to the exact form depicted in the drawings and descriptions thereof, but is considered to include reasonable and obvious equivalents.

What is claimed is:

1. A steering system in a wheeled vehicle, comprising a front-wheel steering linkage arranged to be operated by a steering wheel, a rear-wheel steering linkage including a lateral control shaft operatively connected at the opposite ends thereof with a pair of rear steerable road wheels, a rotary shaft extending longitudinally in a fore-and-aft direction of the vehicle and operatively connected at the front end thereof with said front-wheel steering linkage, and a rear-wheel steering mechanism operatively connected to the rear end of said rotary shaft for effecting axial displacement of said lateral control shaft in response to rotary motion of said rotary shaft, wherein said rear-wheel steering mechanism comprises a housing mounted on a body structure of the vehicle for rotatably supporting thereon said lateral control shaft, a first cylindrical carrier body mounted within said housing for rotation about a vertical axis perpendicular to the central axis of said lateral control shaft and drivingly connected to the rear end of said rotary shaft to be rotated in response to operation of said front-wheel steering linkage, a second cylindrical carrier body mounted within said first cylindrical carrier body for rotation about the central axis of said lateral control shaft, a radial rod integral with said lateral control shaft and arranged within the interior of said second cylindrical carrier body, said radial rod extending perpendicular to the central axis of said control shaft, a universal joint assembly mounted within said second cylindrical carrier body for slidably supporting said radial rod of said control shaft, and an actuator assembly mounted on said housing for rotating said lateral control shaft.

2. A steering system as recited in claim 1, wherein said actuator assembly is activated by an electric control signal indicative of the vehicle speed to rotate said lateral control shaft in accordance with the vehicle speed.

3. A steering system as recited in claim 1, wherein said first cylindrical carrier body is integrally provided at one side thereof with a toothed semi-circular portion in meshing engagement with a pinion provided on the rear end of said rotary shaft.

* * * * *